United States Patent
Holdman et al.

(10) Patent No.: US 10,140,068 B1
(45) Date of Patent: Nov. 27, 2018

(54) ASYNCHRONOUS MANAGEMENT OF MOVABLE COMPONENTS

(71) Applicant: Oracle International Corporation, Redwood Shores, CA (US)

(72) Inventors: Jon Mark Holdman, Wheat Ridge, CO (US); Michael James Dolbear, Boulder, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/670,222

(22) Filed: Aug. 7, 2017

Related U.S. Application Data

(63) Continuation-in-part of application No. 15/665,344, filed on Jul. 31, 2017.

(51) Int. Cl.
*G11B 5/09* (2006.01)
*G06F 3/06* (2006.01)
*G06F 9/54* (2006.01)

(52) U.S. Cl.
CPC ............ *G06F 3/0686* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 5,867,003 A | 2/1999 | Hashimoto et al. | |
| 5,914,919 A | 6/1999 | Fosler et al. | |
| 6,009,455 A * | 12/1999 | Doyle | G06F 9/5072 709/201 |
| 6,049,819 A * | 4/2000 | Buckle | G06F 9/465 707/999.01 |
| 6,109,568 A | 8/2000 | Gilbert et al. | |
| 6,550,391 B1 | 4/2003 | Ostwald et al. | |
| 6,604,103 B1 * | 8/2003 | Wolfe | G06F 17/30306 |
| 6,606,660 B1 * | 8/2003 | Bowman-Amuah | H04L 65/602 709/227 |
| 6,698,359 B1 | 3/2004 | Ostwald et al. | |
| 6,741,182 B1 | 5/2004 | Smith et al. | |
| 6,810,306 B1 | 10/2004 | Ostwald | |
| 7,480,702 B2 * | 1/2009 | Cohn | G06F 3/0605 707/E17.032 |
| 8,788,464 B1 * | 7/2014 | Lola | G06F 17/30584 707/661 |
| 9,432,321 B2 * | 8/2016 | Steiner | H04L 51/16 |
| 2001/0000062 A1 | 3/2001 | Ostwald et al. | |

(Continued)

*Primary Examiner* — Peter Vincent Agustin
(74) *Attorney, Agent, or Firm* — Invoke

(57) ABSTRACT

Techniques for asynchronous management of physical components are disclosed. A request to perform an operation in a tape library, including a physical task to be performed by a component, is received. Based on the request, a message handler is initialized. The message handler executes in an execution thread. State data associated with the component is retrieved from persistent storage. Using the state data, a code object representing the component is instantiated. Using the message handler and the code object, instructions are transmitted to the component to perform the physical task. A process, executing in a different execution thread, receives a message from the component indicating completion of the physical task. Based on the message, another message handler is initialized that updates persistent storage associated with the component.

20 Claims, 13 Drawing Sheets

(56) References Cited

U.S. PATENT DOCUMENTS

| | | | |
|---|---|---|---|
| 2003/0002202 A1 | 1/2003 | Smith et al. | |
| 2003/0002204 A1 | 1/2003 | Ostwald et al. | |
| 2004/0141661 A1* | 7/2004 | Hanna | G06F 19/321 |
| | | | 382/305 |
| 2006/0112173 A1* | 5/2006 | Cohn | G06F 3/0605 |
| | | | 709/220 |
| 2010/0142090 A1 | 6/2010 | Tanaka | |
| 2013/0007245 A1* | 1/2013 | Malik | H04L 41/0816 |
| | | | 709/223 |
| 2013/0159374 A1* | 6/2013 | Steiner | H04L 51/16 |
| | | | 709/201 |
| 2015/0135001 A1* | 5/2015 | Harpaz | G06F 11/2089 |
| | | | 714/4.11 |
| 2016/0072755 A1* | 3/2016 | Su | H04L 51/16 |
| | | | 709/206 |

\* cited by examiner

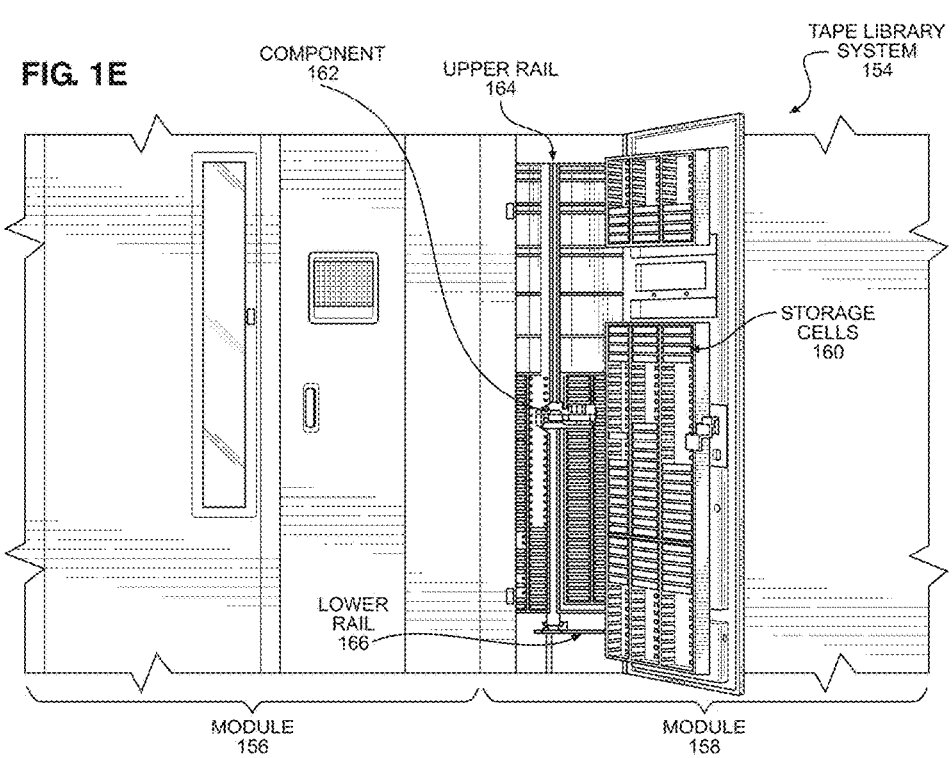

Database Schema
300

FIG. 6B

| RAIL_SEGMENT_RESOURCE | | | |
|---|---|---|---|
| ID | RAIL_ID | START_MIL | END_MIL |
| 506 | 4 | 5000 | 25000 |
| 501 | 4 | 5000 | 35000 |

| CELL_RESOURCE | |
|---|---|
| ID | CELL_ID |
| 501 | 54 |
| 502 | 62 |

| CELL | | | | |
|---|---|---|---|---|
| ID | CELL_TYPE | ADDRESS | DEVICE_ID | MIL_LOCATION |
| 54 | STORAGE | 5,3,2 | 42 | 10000 |
| 62 | STORAGE | 15,2,1 | 46 | 30000 |

| JOB | | |
|---|---|---|
| ID | JOB_TYPE | PARENT_JOB_ID |
| 101 | TOP_LEVEL_MOVE | null |
| 102 | FETCH | 101 |
| 103 | PUT | 101 |

| JOB_PARAMETER | | | | |
|---|---|---|---|---|
| ID | JOB_ID | NAME | VALUE | TYPE |
| 1001 | 101 | SOURCE | 54 | INTEGER |
| 1002 | 101 | DESTINATION | 62 | INTEGER |
| 1003 | 102 | SOURCE | 65 | INTEGER |
| 1004 | 103 | DESTINATION | 62 | INTEGER |
| 1005 | 103 | ROBOT | 22 | INTEGER |

| RESOURCE | | | | |
|---|---|---|---|---|
| ID | RESOURCE_TYPE | JOB_ID | RESOURCE_STATE | NAME |
| 501 | CELL | 101 | ALLOCATED | SOURCE |
| 502 | CELL | 101 | ALLOCATED | DESTINATION |
| 503 | CELL | 102 | COMPLETE | SOURCE |
| 504 | DEVICE | 102 | COMPLETE | ROBOT |
| 505 | RAIL_SEGMENT | 102 | COMPLETE | RAIL_SEGMENT |
| 506 | CELL | 103 | ALLOCATED | DESTINATION |
| 507 | DEVICE | 103 | ALLOCATED | ROBOT |
| 508 | RAIL_SEGMENT | 103 | ALLOCATED | RAIL_SEGMENT |

| DEVICE_RESOURCE | | |
|---|---|---|
| ID | DEVICE_ID | DEVICE_TYPE |
| 505 | 22 | ROBOT |
| 509 | 22 | ROBOT |

| DEVICE | | |
|---|---|---|
| ID | DEVICE_TYPE | DEVICE_STATE |
| 4 | RAIL | USABLE |
| 22 | ROBOT | INACTIVE |
| 42 | MAGAZINE | USABLE |
| 46 | MAGAZINE | USABLE |

State Data
602

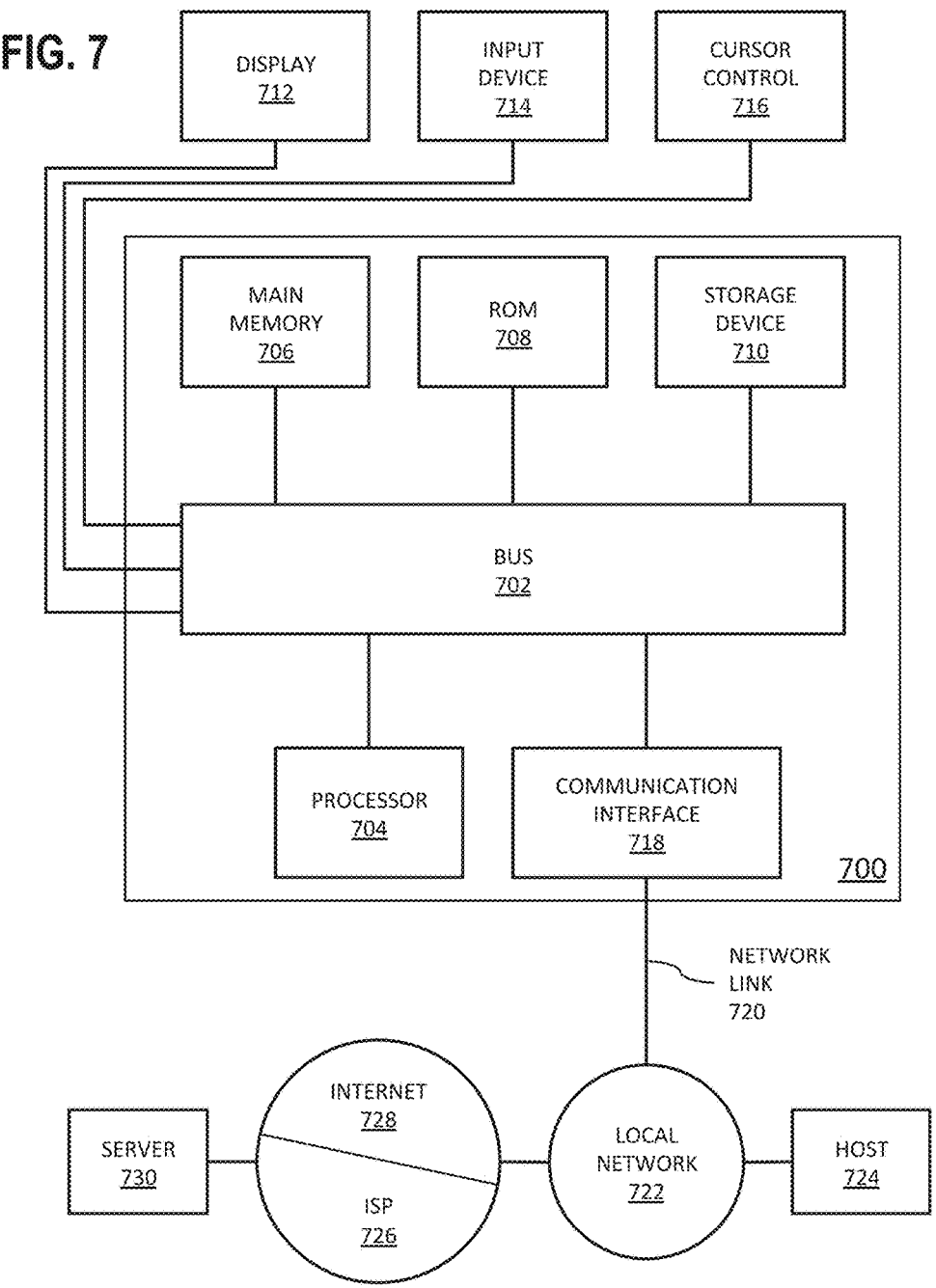

ASYNCHRONOUS MANAGEMENT OF MOVABLE COMPONENTS

BENEFIT CLAIMS; RELATED APPLICATIONS; INCORPORATION BY REFERENCE

This application is a continuation-in-part of U.S. patent application Ser. No. 15/665,344, titled "Reservation-Based Management of Movable Components," filed Jul. 31, 2017 and hereby incorporated by reference.

TECHNICAL FIELD

The present disclosure relates to movable components. In particular, the present disclosure relates to managing movable components.

BACKGROUND

Many different types of mechanical systems include components that are configured to move within the system. For example, in a tape library system (discussed in further detail below), one or more robot arms may be configured to operate along a particular rail. Other examples of components that may be configured to move within a system include doors (which may open and close), storage slots (which may accept and eject storage media), or any other type of component with movable physical parts. Some components may require manual manipulation (i.e., by a human operator) to be moved. Other components may be movable under control of one or more computer processors.

In computer systems, a process may be performed synchronously or asynchronously. In synchronous processing, an execution thread persists throughout the process, from start to finish. All tasks that make up the process are considered a single unit, which either fails or succeeds in its entirety. That is, the persistent execution thread fails and therefore the entire process fails. If the execution thread (the "primary thread") communicates with another execution thread (a "secondary thread"), the primary thread must wait for a response from the secondary thread before continuing the process.

For example, consider a synchronous process for preparing breakfast cereal, with the individual preparing the breakfast cereal conceptualized as the primary execution thread. The primary thread may prepare the breakfast cereal by performing the following tasks, in sequence: taking a cereal box from a cupboard; taking a milk jug from the refrigerator; taking a bowl from a drawer; taking a spoon from another drawer; pouring cereal from the box into the bowl; pouring milk from the jug into the bowl; placing the spoon into the bowl; returning the cereal box to the cupboard; and returning the milk to the refrigerator. The primary thread may enlist a secondary thread to perform one or more of these steps. For example, the primary thread may ask a secondary thread to fetch the spoon. However, the primary thread cannot perform other tasks while it waits for the secondary thread to complete its task(s). In addition, if any of the tasks fails (for example, if the primary thread spills the milk or the secondary thread fails to locate a spoon), then the entire process fails; the breakfast cereal is not prepared.

In asynchronous processing, two or more tasks within a process are completed independently of each other. For example, one execution thread may perform a subset of the tasks and another execution thread may perform another subset of the tasks. If one execution thread delegates a task to another execution thread, the delegating thread may continue executing even as the delegate performs its task. In the breakfast cereal example above, one thread may pour the milk at the same time that another thread returns the box of cereal to the cupboard. In addition, if an execution thread fails, the process may be able to continue using other execution threads. In the breakfast cereal example above, if one thread fails while attempting to obtain the milk jug, another thread may be able to remedy from the failure. Yet another thread may be able to perform another task (e.g., obtaining a spoon) while the failure is being remedied. In other words, in asynchronous processing, the entire process may not be required to succeed or fail as a unit. Thus, asynchronous processing may improve system reliability by allowing a process to continue even if a particular execution thread fails. Alternatively or in addition, asynchronous processing may allow for faster processing, due to parallelism of multiple execution threads.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 1E is an illustration of a tape library system in accordance with one embodiment;

FIGS. 6A and 6B illustrate an example of asynchronous management of movable components in accordance with one embodiment; and FIG. 7 shows a block diagram illustrating a computer system in accordance with one embodiment.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW AND EXAMPLES
3. SYSTEM MANAGER AND SUBSYSTEMS
4. EXAMPLE DATABASE SCHEMA
5. ASYNCHRONOUS MANAGEMENT OF MOVABLE COMPONENTS
6. MESSAGE HANDLER LIFECYCLE
7. ILLUSTRATIVE EXAMPLE
8. MISCELLANEOUS; EXTENSIONS
9. HARDWARE OVERVIEW
10. COMPUTER NETWORKS AND CLOUD NETWORKS

1. General Overview

One or more embodiments, a physical component in a tape library is moved using an asynchronous management process. A request to perform an operation in the tape library is received. The operation includes a physical task to be performed by the physical component. Based on the request, a message handler is initialized. The message handler is executing in an execution thread. State data associated with the physical component is retrieved from persistent storage. Using the state data, a code object representing the physical component is instantiated. Using the message handler and the code object, instructions are transmitted to the physical component to perform the physical task. A process, executing in a different execution thread than the message handler, receives a message from the physical component indicating completion of the physical task. Based on the message, another message handler is initialized that updates persistent storage associated with the physical component. In an embodiment, if a physical component transmits a message indicating a failure of a physical task, a message handler is initialized that performs a remedial action associated with the failure.

One or more embodiments described in this Specification and/or recited in the claims may not be included in this General Overview section.

2. Architectural Overview and Examples

Figure 1A:
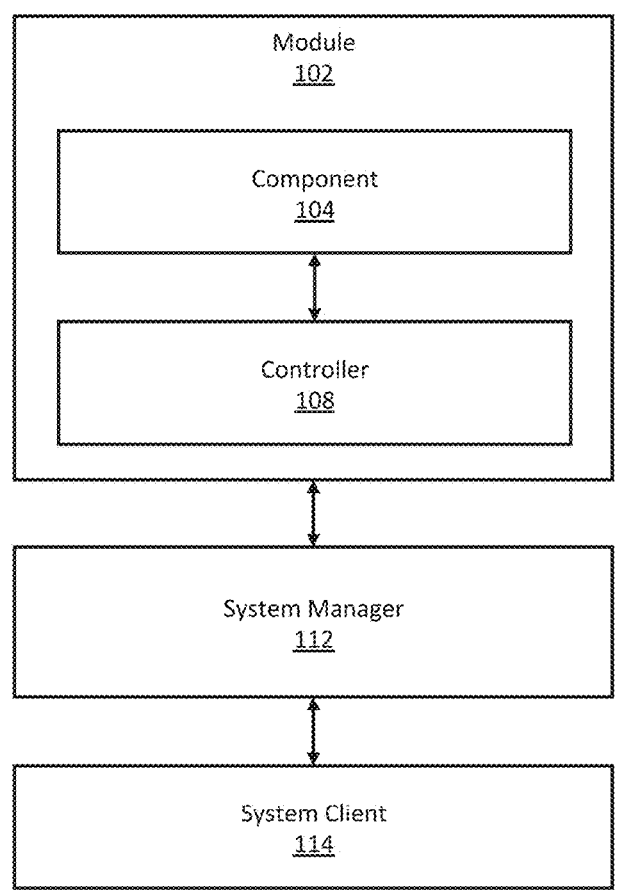
FIG. 1A is a block diagram illustrating a system in accordance with one embodiment.

FIG. 1A illustrates a system 100 in accordance with one or more embodiments. As illustrated in FIG. 1A, system 100 includes a module 102 that includes a component 104 and a corresponding controller 108. The system 100 also includes a system manager 112 and a system client 114. In one or more embodiments, the system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in Section 10, titled "Computer Networks and Cloud Networks."

In one embodiment, the module 102 is a physical unit that includes (i.e., physically within or via a physical connection) at least one component 104. The component 104 is a physical device, the operation of which is adjustable by a servomechanism (not shown). For example, the module 102 may be a vending machine, an industrial machine (e.g., operating in a production line, farm, or warehouse), a printer (e.g., an ink printer, laser printer, or 3-dimensional printer), a medical or scientific device (e.g., an automated pill sorter or substrate mixer), a vehicle (e.g., a railway car or self-driving automobile), an entertainment device (e.g., an amusement park ride or arcade machine), a household device (e.g., a vacuum cleaner or kitchen appliance), a digital storage device (e.g., a hard drive or storage library), a network switch, or any other kind of physical unit in which the operation of a component 104 is adjustable by a servomechanism. Those skilled in the art will appreciate that the foregoing list is not exhaustive and is provided merely by way of example.

While FIG. 1A illustrates only one component 104, the module 102 may include more than one component. For example, as discussed below, a storage library may include multiple robotic arms handling the storage devices managed by the storage library. Many different types of modules that include multiple components exist. Further, the module 104 may be combined with other modules (not shown), and/or the module 104 may be a combination of multiple sub-modules. For example, a storage library may include more than one inter-compatible storage library modules.

In one embodiment, the controller 108 is a digital device that helps control operation of the component 104. Specifically, the controller 108 may be configured to apply electrical signals to the component 104, to control the velocity, position, direction, and/or other operational properties of the component 104. If the module 102 includes multiple components, each component may be associated with a separate controller. Alternatively or in addition, multiple components may be associated with the same controller, and/or a single component may be associated with multiple controllers.

In one embodiment, the controller 108 is configured to perform servomechanism operations for the component 104. Specifically, the controller 108 may be configured to receive feedback associated with the component 104 and, based on the feedback, adjust operation of the component 104. The controller 108 may adjust operation of the component 104 by applying new electrical signals to the component 104 and/or modifying electrical signals that are already being applied to the component 104.

In one embodiment, the controller 108 is directly coupled to the component 104 in a manner that causes the controller 108 to physically move with the component 104. For example, a controller for a robotic arm may be directly connected to the arm itself, so that when the arm moves, the controller is carried along with it. Alternatively, the controller 108 may be remotely coupled to the component 104 (e.g., through a network cable) so that the controller 108 does not move with the component 104.

In one embodiment, the system manager 112 is configured to manage operation of the module 102. Specifically, the system manager 112 may issue instructions to the controller 108, which in turn controls operation of the component 104 based on those instructions. For example, in storage library where the component 104 is a robotic arm, the system manager 112 may issue instructions to the controller 108 to remove a particular storage device. Based on those instructions, the controller 108 may apply electrical signals to the component 104 (i.e., the robotic arm in this example) so that the component 104 moves to the location of the storage device in the module 102 and removes the storage device. While the system manager 112 is shown in FIG. 1A as being separate from the module 102, the system manager 112 may itself be a component of the module 102. For example, if the module 102 is a storage library, the system manager 112 may be a server housed in the storage library enclosure. In one embodiment, the system manager 112 and is configured to perform asynchronous management of components (e.g., component 104) in the module 102. Asynchronous management of components is discussed in further detail below.

In one embodiment, the system manager 112 receives instructions from a system client 114. Specifically, the system client 114 may be a computing device operating separately from the module 102 and system manager 112, for which the module 102 provides services. The system client 112 may be a web server or host, such as a server providing cloud-based services for multiple tenants (not shown). Accordingly, the system client 114 may have clients of its own, corresponding to the various tenants. In this example, the module 102 is part of the underlying infrastructure providing cloud-based services for the tenants. Cloud networks are discussed in further detail below. Alternatively or in addition, a system client 114 may be a tenant system or some other type of end user of the module 102. Further, the system 100 may include multiple system managers, and/or the system 100 may include multiple system clients communicatively coupled with each system manager.

In one embodiment, elements of the system 100, such as the controller 108, system manager 112, and/or system client 114, are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 1B:
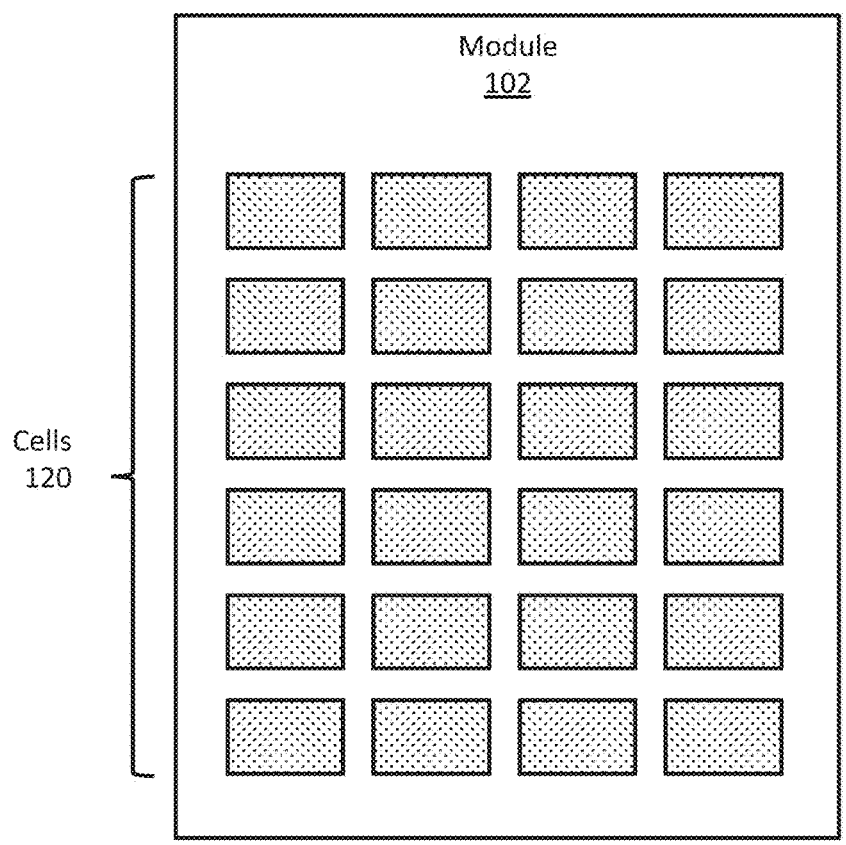
FIGS. 1B and 1C are block diagrams illustrating a module in accordance with one embodiment.

FIG. 1B is a block diagram illustrating a module 102 in accordance with one embodiment. Specifically, FIG. 1B illustrates an abstracted cross-section of a module 102 in accordance with one embodiment. The module 102 includes multiple cells 120 on which components (not shown in FIG. 1B) of the module 102 are configured to operate. In general, referring to FIG. 1B, the term "cells" may refer to a set of similar physical locations in the module 102. For example, if the module 102 is a vending machine, the cells 120 may be so-called "columns" corresponding to particular product selections. If the module 102 is a storage library, the cells 120 may be slots into which storage media (e.g., drives, disks, cartridges, etc.) are inserted. If the module 102 is a network switch, the cells 120 may be physical ports into which cables are inserted. The cells 120 may not be all of the same type. For example, in a storage library, some of the cells 120 may be general-purpose storage cells accepting different types of storage media, while others of the cells 120 may be specific types of storage cells accepting only a particular type of storage media, such as tape cartridges. Many different types of modules exist having different kinds of cells.

In one embodiment, the module 102 includes components in addition to cells or other than cells. In general, the module 102 may include many different types of electronic components, such as a power supply, network connection, sensors, display, storage device, service port, and/or any other type of appropriate electronic component depending on the specific type of module 102.

Figure 1C:
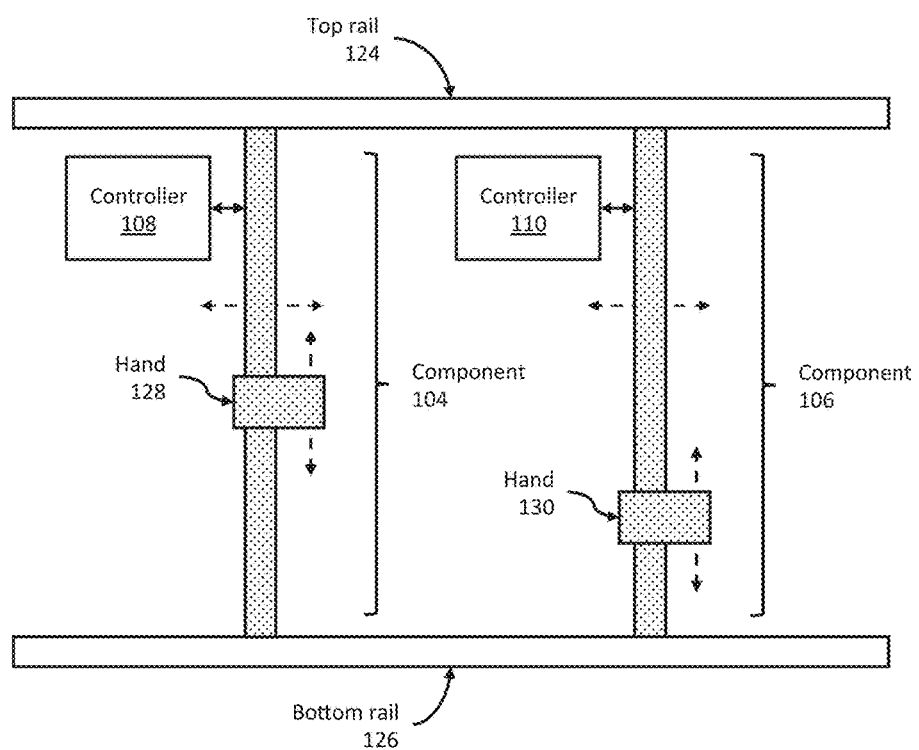

For example, FIG. 1C is a block diagram illustrating a module 102 in accordance with one embodiment. As illustrated in FIG. 1C, the module 102 includes two components 104, 106 operating along a top rail 124 and a bottom rail 126. As used here, the terms "top" and "bottom" are used to differentiate between the rails and may not accurately denote the vertical configuration of the top rail 124 and bottom rail 126 relative to each other. For example, the top rail 124 and bottom rail 126 may be on a same horizontal plane as each other, with FIG. 1C representing an overhead view of the module 102. Many different physical rail configurations may be used. Further, the module 102 may not include any rails, may include more than two rails, or may include only a single rail.

In one embodiment, component 104 has a hand 128 and component 106 has a hand 130. The hands 128, 130 are physical mechanisms used to manipulate other components and/or items in the module 102. For example, the hands 128, 130 may be used to manipulate items placed in cells in the module 102, such as the cells 120 illustrated in FIG. 1B. In one embodiment, the components 104, 106 are configured to follow one axis (e.g., horizontally) along the top rail 124 and bottom rail 126, while the hands 128, 130 are configured to follow another axis (e.g., vertically) along the components 104, 106. In this manner, the hands 128, 130 may be able to reach many different locations within the module 102. Further, if the module 102 has more than one rail, a component may have more than one motor (not shown), with each motor affecting movement of the component along the corresponding rail. In an embodiment, rails in multiple modules and/or sub-modules may be connected, allowing one or more components to move between the modules and/or sub-modules. For example, in a tape library system, robot arms may be able to move from one tape library module to another tape library module, along one or more interconnected rails.

In one embodiment, each of the components 104, 106 has a corresponding controller 108, 110. Each controller is configured to apply electrical signals to its corresponding component, to control movement of the component within the module 102. As illustrated in FIG. 1C, each controller 108, 110 may be directly connected to its corresponding component 104, 106, so that when the component travels along the top rail 124 and bottom rail 126, the corresponding controller moves along with it. Alternatively, one or more of the controllers 108, 110 may be remotely connected to its corresponding component, so the controller does not move with the component.

Figure 1D:
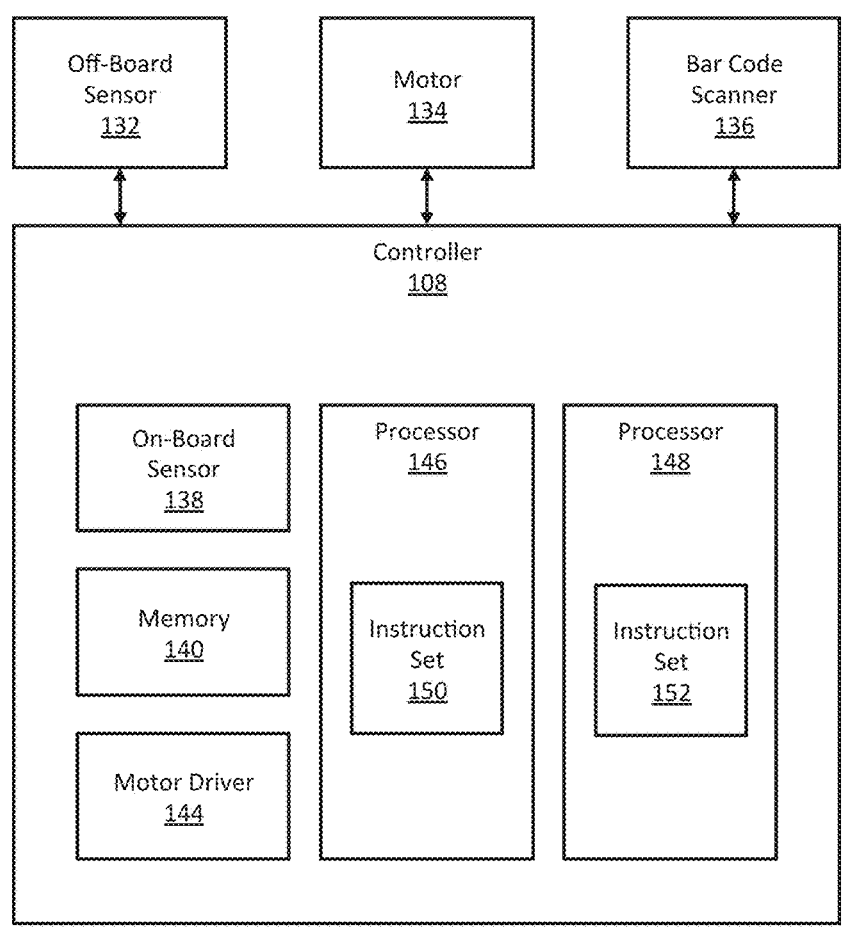
FIG. 1D is a block diagram illustrating a controller in accordance with one embodiment.

FIG. 1D is a block diagram illustrating a controller 108 in accordance with one or more embodiments. The controller 108 is configured to control the operation of a component (not shown) in a module (not shown). The controller 108 may be a logic board, server, or any other type of computing structure or device suitable to perform controller operations described herein.

In one embodiment, the controller 108 includes one or more processors. As illustrated in FIG. 1D, the controller 108 includes two processors; processor 146 and processor 148. Each processor 146, 148 operates using a corresponding instruction set. Specifically, processor 146 uses instruction set 150, and processor 148 uses instruction set 152. The processors 146, 148 may be of the same type or may be of different types. For example, processor 146 may use a general purpose instruction set 150 and processor 148 may use a specialized instruction set 152. In one embodiment, the specialized instruction set 152 includes floating point operations that allow processor 148 to perform mathematical functions for a servomechanism more rapidly than processor 146 would be able to perform those same mathematical functions using the general purpose instruction set 150. For example, a general-purpose processor may be an Advanced RISC Machines (ARM) processor based on the Reduced Instruction Set Computer (RISC) design and the other processor may be a Digital Signal Processing (DSP) processor optimized for digital signal processing including floating point operations. Specifically, the DSP processor may be optimized for measuring, filtering, and/or compressing digital or analog signals, which may involve performing complex mathematical calculations. Performing those calculations quickly may help avoid performance concerns associated with latency and/or offload mathematical calculations from the general purpose processor. The DSP processor may also include fewer transistors and/or use less power than the general-purpose processor. In one embodiment, a general-purpose processor executes instructions relating to high-level commands and general system operations, while a specialized processor handles complex mathematical functions.

In one embodiment, the controller 108 also includes one or more non-transitory computer readable media, such as memory 140 and/or some other type of medium, for storing instructions and/or data used by the one or more processors 146, 148 to perform servomechanism operations. The one or more computer readable media may include executable instructions corresponding to one or more operating systems used by the processor(s), such as a LINUX operating system and/or a reduced kernel of an operating system.

In one embodiment, the controller 108 receives feedback about the operation of the component. The feedback may be used as input to servomechanism operations. For example, the controller 108 may receive feedback from one or more off-board sensors 132. As used here, the term "off-board" means that an off-board sensor 132 is communicatively coupled with the controller 108 but is not part of the controller 108 itself. For example, the off-board sensor 132 may be a sensor physically attached or communicating with the component, such as a thermometer, tachometer, tilt sensor, current sensor, or any other kind of sensor configured to receive feedback about the operation of the component and provide the feedback to the controller 108.

Alternatively or in addition, the controller 108 may include one or more on-board sensors 138. As used here, the term "on-board" means that the on-board sensor 138 is part of the controller 108 itself. For example, if the controller 108 is a logic board, the on-board sensor 138 may be attached to the same logic board. The on-board sensor 138 may be a thermometer, tachometer, tilt sensor, current sensor, or any other kind of sensor configured to receive feedback about the operation of the component.

In one embodiment, the controller 108 is configured to apply electrical signals to the component, to modify the component's operation. For example, the controller 108 may include a motor driver 144 configured to transmit electrical signals to a motor 134 that causes the component to move. The particular electrical signals transmitted from the motor driver 144 to the motor 134 may help determine how the component moves (i.e., direction, speed, etc.). Further, the component may include more than one motor 134, and a combination of electrical signals to the various motors may help determine how the component moves. A motor driver 144 may be configured to transmit electrical signals to a single motor 134, or to multiple motors. For a component with more than one motor (for example, a component operating along more than one rail), more than one motor driver may be used.

In an embodiment, the controller 108 uses a motor 134 and off-board sensor 132 to perform servomechanism functions as follows. One or more processes executed by the controller 108 apply a voltage and/or current to a motor 134. An off-board sensor 132 (e.g., an encoder) provides feedback about the actual motion of the motor 134. The controller 108 uses the feedback to adjust the voltage and/or current applied to the motor 134. Adjusting the voltage and/or current in response to the feedback allows the controller 108 to achieve (or more closely approximate) the desired motion of the component being moved by the motor 134.

In one embodiment, the controller 108 is configured to control and receive feedback from various parts of the component, some of which may not be related to servomechanism operations. For example, the controller 108 may be configured to transmit electrical signals to, and receive electrical signals from, a bar code scanner 136. The bar code scanner 136 may be configured to read bar codes of items manipulated by the component within a module. For example, a hand 128 as illustrated in FIG. 1C may include a bar code reader. The bar code reader may be used to identify items stored in cells 120 as illustrated in FIG. 1B.

FIG. 1E is an illustration of a tape library system 154 in accordance with one embodiment. In this example, the tape library system 154 includes two modules: module 156 and module 158. The modules are connected along a vertical edge to form a single, modular unit. An upper rail 164 and lower rail 166 run the horizontal length of the tape library system 154, allowing a component 162 to access storage cells 160. Each of the storage cells 160 may be configured to accept tape drives and/or other storage media, as discussed above. In FIG. 1E, the storage cells 160 run the length of the tape library system 154 in both the front and back. The component 162 is a robot arm connected to the upper rail 164 and lower rail 166, allowing the component 162 to move along the rail under power of one or more motors. The component 162 also includes a robot hand, which moves vertically along the robot arm to access storage cells 160 at different heights in the tape library system 154. In one embodiment, the tape library system 154 includes more than one robot arm (not shown).

3. System Manager and Subsystems

Figure 2:
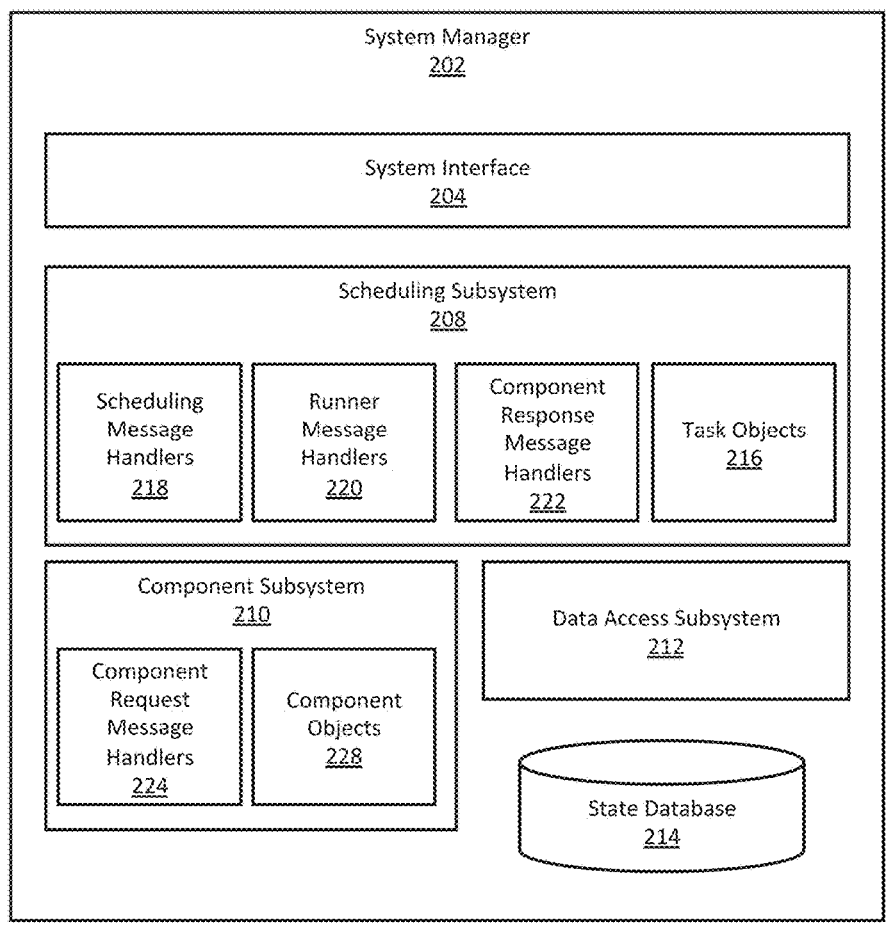
FIG. 2 is a block diagram illustrating a system in accordance with one embodiment.

FIG. 2 illustrates a system 200 in accordance with one or more embodiments. As illustrated in FIG. 2, the system 200 includes a system manager 202 with a system interface 204, a state database 214, and one or more subsystems, such as a scheduling subsystem 208, component subsystem 210, and data access subsystem 212. Each subsystem may have multiple subcomponents. In one or more embodiments, the system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in Section 10, titled "Computer Networks and Cloud Networks."

In an embodiment, the system manager 202 is configured to perform asynchronous management of physical components. Specifically, the system manager 202 may correspond to the system manager 112 illustrated in FIG. 1A and may perform asynchronous management of one or more components in a module 102 as illustrated in FIG. 1A. Asynchronous management of physical components is discussed in further detail below.

In an embodiment, the system manager 202 is part of a distributed system. Specifically, one or more of the subsystems described below may be implemented using multiple execution threads, which may be executing on different processors. Two or more of the processors may be located in different computer systems. For example, the system manager 202 and/or components thereof may be implemented as a computing cluster that includes multiple computer systems, each having one or more processors executing therein. In particular, a computing cluster may be used to distribute parts of an asynchronous management process across multiple processors executing in multiple computer systems. Two or more different message handlers, described below, may execute in two or more different execution threads. Thus, a computing cluster may help provide for increased processing power and/or system redundancy associated with asynchronous processing.

In an embodiment, the subsystems of the system manager 202 use message handlers to manage one or more tasks associated with operations. For the purposes of this discussion, a "task" is part of an operation and not the operation in its entirety. In other words, an operation involves multiple tasks to be performed as part of the operation. For example, an operation may involve tasks that must be performed in a particular order, tasks that may be performed concurrently, or a combination thereof. A message handler is a unit of instructions that execute in an execution thread to perform a particular task as part of an operation. In addition, a message handler may invoke additional message handlers to perform subtasks of a task.

In an embodiment, the sequence of events leading from a message handler being asked to perform a task to when it terminates may be referred to as its "lifecycle." A message handler may have a lifecycle that lasts as long as necessary to receive a message and perform a task based on the message. A message handler may be created and added to a pool of message handlers in a ready state, waiting to process a message. Messages may be received in a queue and assigned to appropriate message handlers. When a message is assigned to a message handler, the message handler performs a task based on the message and then is terminated. For example, a message handler may be implemented as a Java Message-Driven Bean ("MDB") using the Java Platform, Enterprise Edition ("Java EE"). The system manager 202 may include an Enterprise JavaBeans™ ("EJB") server that supplies one or more EJB containers. One or more named Java Messaging Service ("JMS") queues in an EJB container may receive messages and assign them to the appropriate MDB's. In addition to MDB's, session EJB's and/or entity EJB's may be used.

In an embodiment, the system manager 202 includes a system interface 204, through which the system manager 202 receives requests for operations. The system interface 204 may be any type of interface through which the system manager 202 receives requests from one or more system clients, such as the system client 114 illustrated in FIG. 1A. For example, the system interface 204 may be a representational state transfer ("REST") interface. Those skilled in the art will appreciate that there are many different types of interface that a client may use to communicate requests to a system. In an embodiment, the system interface 204 is configured to authenticate requests, to ensure that only authorized client(s) are permitted to requests operations to be managed by the system manager 202.

In an embodiment, an operation may involve one or more physical tasks to be performed by one or more components. For example, in a tape library system, the system interface 204 may receive requests to manipulate tape cartridges. Manipulating a tape cartridge requires a robot arm to perform one or more physical tasks, such as moving to a particular location in tape library system and using its hand to manipulate the tape cartridge. Moving to a location and manipulating the cartridge may be considered different physical tasks. In an embodiment, a request to perform an operation, received via the system interface 204, is a relatively high-level request and the system manager 202 determines which physical task(s) are needed to satisfy the request. A physical task may involve multiple subtasks.

In an embodiment, the system manager 202 includes a scheduling subsystem 208. The scheduling subsystem 208 is configured to determine an order in which to perform the operations (e.g., operations requested via the system interface 204). The scheduling subsystem 208 may also be responsible for maintaining the state of resources in the system and allocating those resources to tasks. Resources allocated by the scheduling subsystem 208 may include any type of resource implemented in hardware and/or software, including physical components, as described herein. The scheduling subsystem 208 may use a reservation-based approach for managing requests and allocating resources. Reservation-based approaches are described in further detail in U.S. patent application Ser. No. 15/665,344, titled "Reservation-Based Management of Movable Components," referenced above. In an embodiment, the scheduling subsystem 208 uses message handlers to manage tasks asynchronously, as described in further detail below. The scheduling subsystem 208 may track the status of an operation using state data in a state database 214. Specifically, message handlers operating in the scheduling subsystem 208 may store and retrieve state data in the state database 214 via a data access subsystem 212 of the system manager 202.

In an embodiment, the scheduling subsystem 208 uses different types of message handlers to handle different types of tasks. For example, scheduling message handlers 218 may receive messages when operations and/or tasks are requested or when operations and/or tasks are completed. Specifically, a scheduling message handler 218 may examine the state of the system and a queue of pending operations and/or tasks, to determine whether the necessary resources are available. The scheduling message handler 218 may implement a reservation-based approach as discussed above. If the necessary resources are available, then the scheduling message handler 218 may send a message to a runner message handler 220 and then terminate. Runner message handlers 220 may be responsible for initiating the processing of an operation or task. Initiating the processing of an operation or task may involve, for example, dividing an operation into tasks, dividing a task into subtasks, and/or transmitting requests to components to perform physical tasks. Runner message handlers 220 may also be able to mark an operation or task to be cancelled, query the status of an operation or task, determine whether an operation or task needs resources, etc. Upon initiating the processing of an operation, a runner message handler 220 may terminate.

Component response message handlers 222 may receive messages from components and pass the messages to one or more appropriate scheduling message handlers 218 for further processing. Upon passing a message to an appropriate scheduling message handler 218, a component message handler 222 may terminate.

In an embodiment, in addition to scheduling message handlers 218, runner message handlers 220, and/or component response message handlers 222, the scheduling subsystem 208 includes other message handlers and/or other types of instructions for managing the flow of operations and/or tasks. For example, in a Java EE framework, an MDB may allocate work to a stateless session bean. As another example, the system manager 202 may be implemented using object-oriented techniques. Components of the system manager 202 may use various classes, instantiate objects of those classes, then invoke methods in those objects. For example, the scheduling subsystem 208 may maintain classes that correspond to different types of tasks and that are instantiated as task objects 216, as part of performing those tasks. In a tape library system, different classes may correspond to physical tasks performed by robots, such as "move to a specific position," "fetch a data cartridge from a location," and "put a data cartridge to a location." Each type of task may implement a superclass providing abstract or general task functionality. For example, the superclass may include one or more methods for allocating resources needed by tasks. A method may invoke other classes and/or message handlers. In an embodiment, the system manager 202 manages the state of objects, including task objects 216 and/or objects that represent physical components as described below, using state data in the state database 214. Many different configurations of message handlers, object classes, and/or other types of instructions may be used.

In an embodiment, the system manager 202 includes a component subsystem 210. The component subsystem 210 provides an interface for the system manager 202 to communicate with physical components (not shown in FIG. 2). Specifically, component request message handlers 224 may handle requests to the component subsystem 210. The component request message handlers 224 may manage physical components using component objects 228, where instructions implemented by each component object 228 are translated to instructions, corresponding to physical tasks, to be sent to the associated physical component(s). To instantiate a component object 228, the component subsystem 210 may retrieve the state of the corresponding component from the state database 214, via the data access subsystem 212.

For example, in a tape library system, the component subsystem 210 may represent a physical robot as an instance of a robot class. Methods of the robot class may correspond to physical tasks to be performed by the robot. When a "move" method of a robot object is invoked, the component subsystem 210 may transmit instructions to the associated robot to move in a manner indicated by arguments supplied to the method. When a physical task completes, the component subsystem 210 may transmit a message to the scheduling subsystem 208. The message may indicate whether the physical task succeeded or failed. The message may be received in a message queue and dispatched to a message handler, such as a component response message handler 222 as described above.

As discussed above, in an embodiment, the system manager 202 includes a data access subsystem 212. The data access subsystem 212 may be used by other subsystems of the system manager 202 to store and retrieve data in a state database 214. For example, the state database 214 may store state data indicating the states of particular operations and/or tasks within operations. As another example, the state database may store data indicating the states of particular physical components. Many different types of state data may be stored in the state database 214. An example of a database schema for storing state data is discussed below.

In one embodiment, the state database 214 is any type of storage unit and/or device (e.g., a file system, database, collection of tables, or any other storage mechanism) for storing data. Further, the state database 214 may include multiple different storage units and/or devices. The multiple different storage units and/or devices may or may not be of the same type or located at the same physical site. Further, the state database 214 may be implemented or may execute on the same computing system as one or more other components illustrated in FIG. 2. Alternatively or additionally, the state database 214 may be implemented or executed on a computing system separate from one or more components illustrated in FIG. 2. The state database 214 may be communicatively coupled to other components illustrated in FIG. 2 via a direct connection or via a network.

In one embodiment, elements of the system 200, such as the system interface 204, system manager 202, scheduling subsystem 208, component subsystem 210, data access subsystem 213, and/or state database 214, are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

4. Example Database Schema

Figure 3:
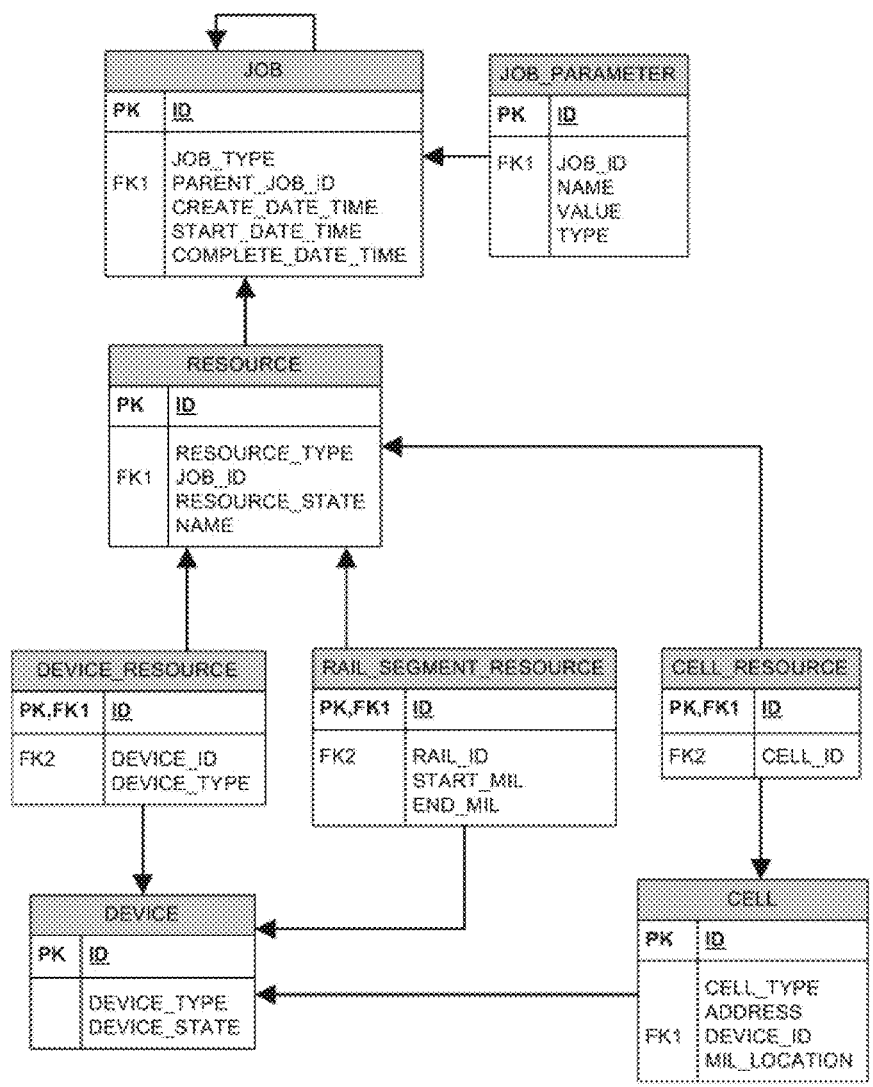
FIG. 3 illustrates an example of a database schema in accordance with one embodiment.

FIG. 3 illustrates an example of a database schema 300 in accordance with an embodiment. A database schema 300 may include more or fewer components than those illustrated in FIG. 3. For example the database schema 300 illustrated in FIG. 3 may be a subset of a larger database schema. Alternatively or in addition, components of a database schema may be related to each other in different ways than the example illustrated in FIG. 3. The database schema 300 illustrated in FIG. 3 and discussed here is provided for exemplary purposes only and should not be construed as limiting one or more embodiments.

In the example illustrated in FIG. 3, the database schema 300 is for a database used to manage state data for a tape library system. As used here, the word "job" refers to an operation, task, or subtask, and the word "device" refers to a physical component in the tape library system. As illustrated in the database schema 300, a particular JOB may have zero or more JOB_PARAMETERs, zero or more child JOBs (e.g., subtasks) and zero or more allocable RESOURCEs. Three different types of resources are shown here: DEVICE_RESOURCEs, RAIL_SEGMENT_RESOURCEs; and CELL_RESOURCEs. Other types of resources may be used. A particular RAIL_SEGMENT_RESOURCE includes a start location of a rail segment, measured in this example in mils (thousands of an inch) and an end location of the rail segment, also measured in mils. A particular DEVICE corresponds to a physical component in the tape library system, such as a tape drive, a robot, a controller card, or any other type of physical component. A particular CELL is a physical location where a cartridge may be placed, and is located within a particular DEVICE, such as a magazine. A particular DEVICE may have zero or more CELLs.

5. Asynchronous Management of Movable Devices

Figure 4A:
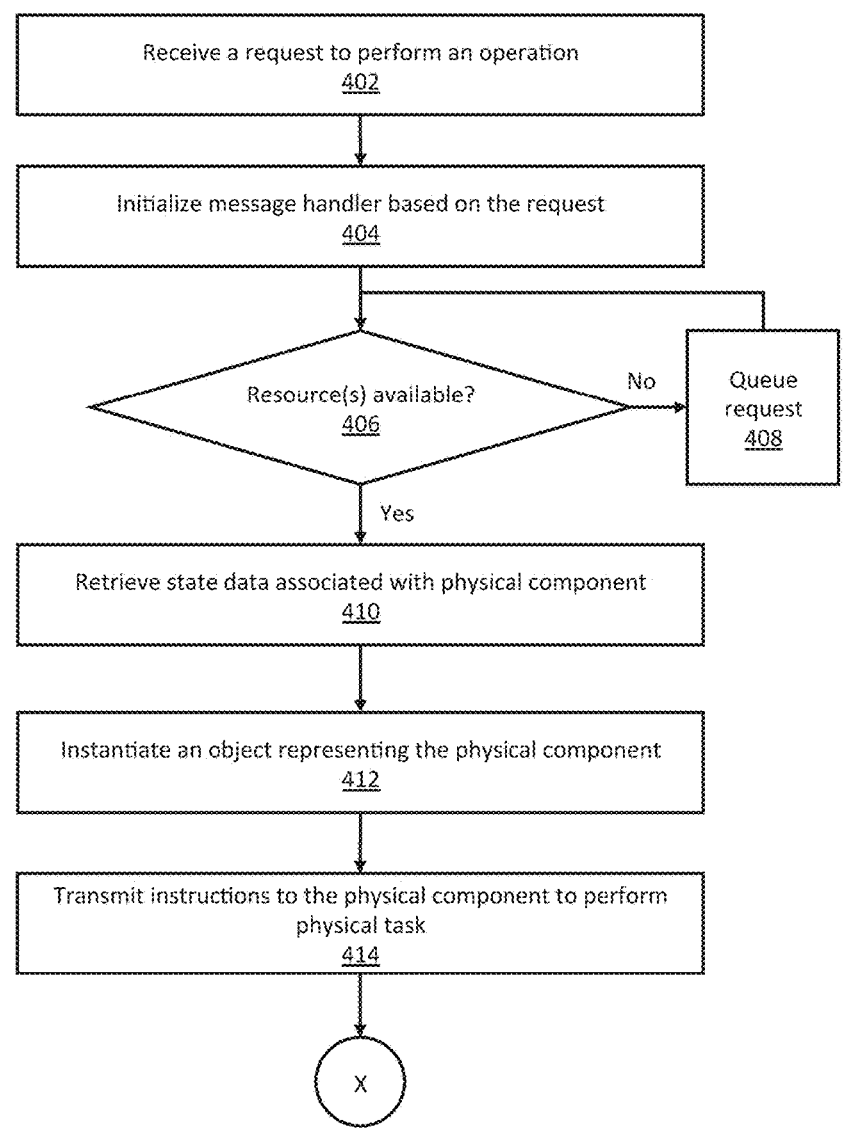
FIGS. 4A and 4B illustrate a set of operations for asynchronous management of movable components in accordance with one embodiment.
Figure 4B:
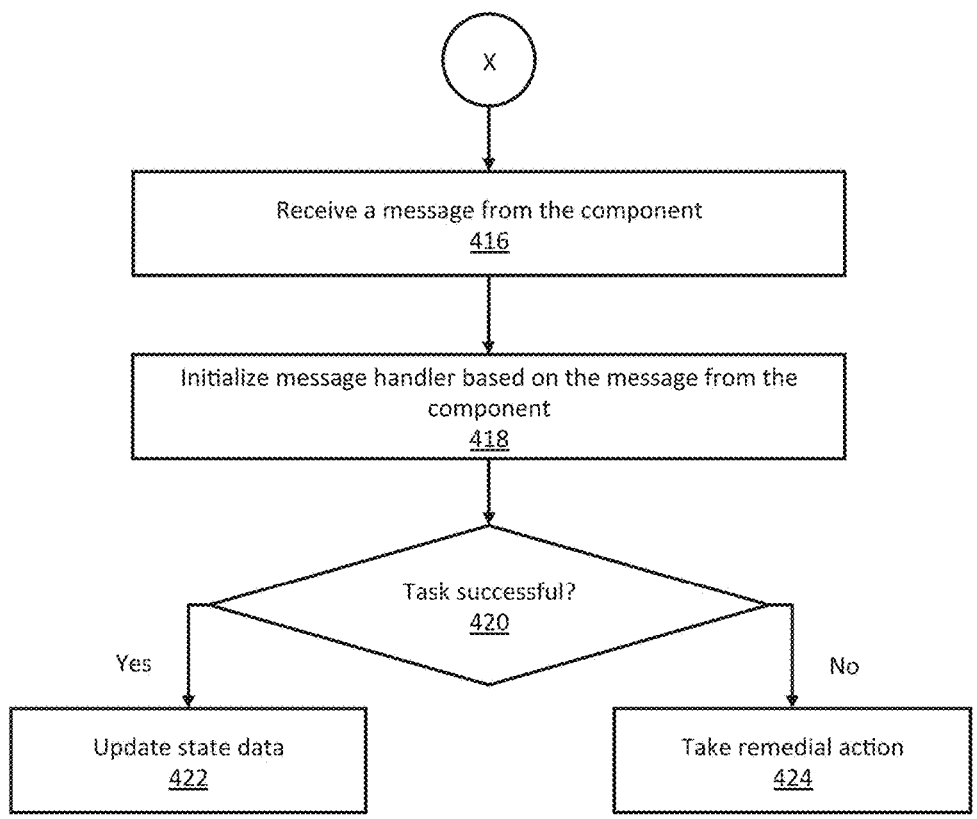

In one embodiment, movable physical components are managed using one or more asynchronous processes. Specifically, to perform an operation, asynchronous message handlers may be used. FIGS. 4A and 4B illustrate an example set of operations for asynchronous management of movable components in accordance with one or more embodiments. One or more operations illustrated in FIGS. 4A and 4B may be modified, rearranged, or omitted all together. Accordingly, the particular sequence of operations illustrated in FIGS. 4A and 4B should not be construed as limiting the scope of one or more embodiments. Further, in the following discussion, a system manager is referred to as performing various functions. Specifically, the system manager may use various subsystems as described above. However, in an embodiment, one or more of the operations described below are instead performed by one or more other system components. For example, one or more operations may be performed by a controller card.

In an embodiment, the system controller receives a request to perform an operation (Operation 402). The request may correspond to a relatively high-level request, such as a request to move a tape to a particular tape drive. The system manager may be responsible for breaking the operation into multiple tasks.

In an embodiment, the system controller initializes a message handler based on the request (Operation 404). Initializing the message handler may involve creating the message handler. For example, in an object-oriented framework, a message handler may be created by instantiating an object based on a message handler class. Alternatively, a message handler may already have been created (e.g., instantiated) and may be waiting in a ready state. Initializing the message handler may involve invoking functionality of the message handler. For example, initializing the message handler may involve calling a method of the message handler to bring it out of a ready state.

For example, the system controller may dispatch the message to a scheduling message handler as described above. One or more of the operations described below may be performed by this message handler, executing in an execution thread. Alternatively or in addition, the message handler may invoke another message handler and/or another type of instructions to perform operations. For example, the message handler may invoke another message handler and then terminate. The message handler may invoke multiple message handlers corresponding to multiple subtasks. Examples of message handlers and other types instructions, in accordance with one or more embodiments, are described above and below.

In an embodiment, the system manager determines whether the resource(s) needed to perform the operation are available (Operation 406). If one or more resources needed are not available, then the system manager queues the request (Operation 408). The operation may resume when the necessary resources become available.

In an embodiment, the system manager retrieves state data associated with a physical component (Operation 410). Specifically, the state data may be associated with a physical component that the system manager will attempt to use to perform a physical task as part of the operation. The system manager may instantiate an object representing the physical component (Operation 412).

In an embodiment, the system manager transmits instructions to the physical component to perform a physical task (Operation 414). Specifically, the system manager may use an object representing the physical component (e.g. as discussed with reference to Operation 412) to transmit the instructions to the physical component. For example, the system manager may invoke a method of the object, which is translated into instructions transmitted to the physical component. In an embodiment, the instructions are transmitted using a message handler. For example, a message handler may call a method of an object representing the physical component. The message handler may be a different message handler than the one discussed above with respect to Operation 404. For example, the message handler initialized in Operation 404 may be a scheduling message handler, and the message handler used to transmit instructions to the physical component may be a component request message handler, as discussed above. When multiple message handlers are involved in an operation, the message handlers may execute in the same execution thread or in different execution threads.

In an embodiment, the system manager receives a message from the physical component (416) to which the instructions were transmitted in Operation 414. The message may indicate that the physical task completed successfully. Alternatively, the message may indicate that the physical task failed to complete successfully. In an embodiment, when instructions are transmitted to a component, the system manager starts a timer, indicating a maximum allowable time for the physical task to complete. A monitoring process determines whether a message has been received from the physical component before the timer expires. If the timer expires before a message is received from the component, the monitoring process may transmit a message indicating an error condition.

In an embodiment, the system manager initializes a message handler based on the message from the component (Operation 418). Alternatively the system manager may initialize a message handler based on a message from a monitoring service, as described above. For example, the system manager may initialize a component response message handler, as discussed above. In an embodiment, the system manager determines whether the task was successful (Operation 240). Determining whether the task was successful may involve processing the message, by the message handler, to determine whether the contents of the message indicate success or failure.

In an embodiment, if the task was not successful, then the system manager may take remedial action (Operation 424). Taking remedial action may involve reattempting the physical task. The physical task may be reattempted using the same physical component or a different physical component. For example, in a tape library system with two or more robots, if one robot fails to complete a task, the system manager may transmit instructions to another robot to reattempt the task. Alternatively or in addition, taking remedial action may involve attempting to restart or reset a physical component to an operable state. Restarting or resetting a physical component may be performed using message handlers, as described above. Specifically, a request to restart or reset a physical component may be treated by a high priority request by the scheduling subsystem. For example, operations and/or tasks may be assigned priorities on a numerical scale, with 1 being low priority and 10 being high priority. While a typical task may be assigned a medium (e.g., 5) or low priority, resetting or restarting a component may be assigned a high priority.

In an embodiment, if the task is successful, then the system manager updates state data (Operation 422). Specifically, the system manager may update state data associated with an operation, state data associated with a task, state data associated with a component, or any combination thereof. The system manager may update state data associated with an operation, task, and/or subtask at various times. States that may be used include, for example: cancelled, completed, completed with error, needs resources, running, running and waiting for component response, running and waiting for subtask, runnable, or any other type of state representing the status of an operation, task, and/or subtask.

6. Message Handler Lifecycle

Figure 5:
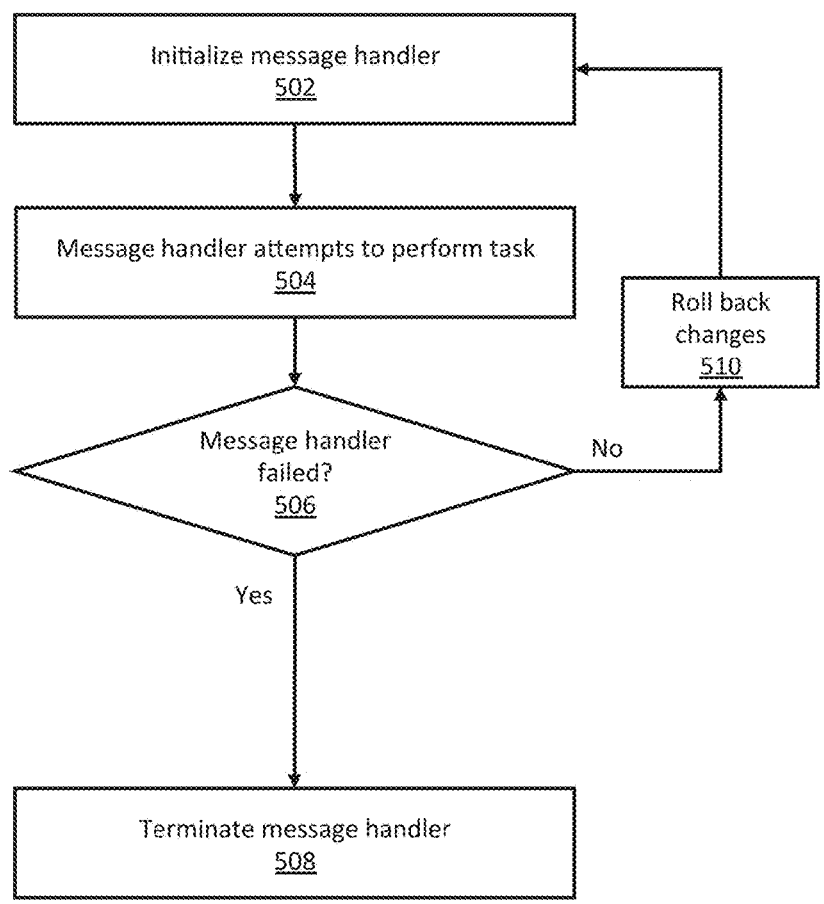
FIG. 5 illustrates an example set of operations corresponding to a message handler lifecycle in accordance with one embodiment.

In an embodiment, one or more of the operations describe above with respect to FIG. 4 may be performed using message handlers. If a message handler fails, the system manager may attempt to take remedial action using a different message handler. FIG. 5 illustrates an example set of operations corresponding to a message handler lifecycle in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

In an embodiment, a message handler is initialized (Operation 502) based on a message. For example, a message may be received in a message queue and dispatched to the message handler. As discussed above, initializing the message handler may involve creating (e.g., instantiating) the message handler. Alternatively, initializing the message handler may involve moving the message handler from a ready state to a message-handling state.

In an embodiment, the message handler attempts to perform a task based on the message (Operation 504). Specifically, the message handler may execute instructions corresponding to handle the message according to business logic implemented in the message handler. All of the instructions may be part of the message handler itself. Alternatively, the message handler may invoke other instructions to handle the message. The instructions may involve transmitting a message to be handled by a different message handler.

In an embodiment, a determination is made whether the message handler failed (Operation 506). The determination may be made by the system manager. Specifically, the system manager may monitor the statuses of message handlers and determine whether an execution thread, corresponding to a message handler, terminates unexpectedly or with an error condition. For example, in an object-oriented framework, a message handler may throw an exception.

In an embodiment, if the message handler has failed, then the system manager rolls back changes made by the message handler (Operation 510). Rolling back changes may involve not committing changes to a state database. Alternatively or in addition, rolling back changes may involve reverting one or more records in a state database to an earlier state. The system manager may then initialize a different message handler (returning to Operation 502). Specifically, the system manager may initialize a new message handler to handle the same message that the previous message handler failed to handle successfully. The new message handler may be executing in a different thread than the previous message handler. For example, the previous message handler may have been executing in a thread on a particular processor, and that processor may have crashed, been taken offline, or otherwise failed. The new message handler may be executing in a different thread, on a different processor that was not impacted by the failure. Thus, reattempting the task using a new message handler may provide redundancy and allow the system manager to quickly recover from a failure without terminating the entire operation associated with the task.

In an embodiment, if the message handler has not failed, then the message handler terminates normally (Operation 508). Specifically, the message handler may terminate once it has completed the particular task that was dispatched to it.

7. Illustrative Example

Figure 6A:
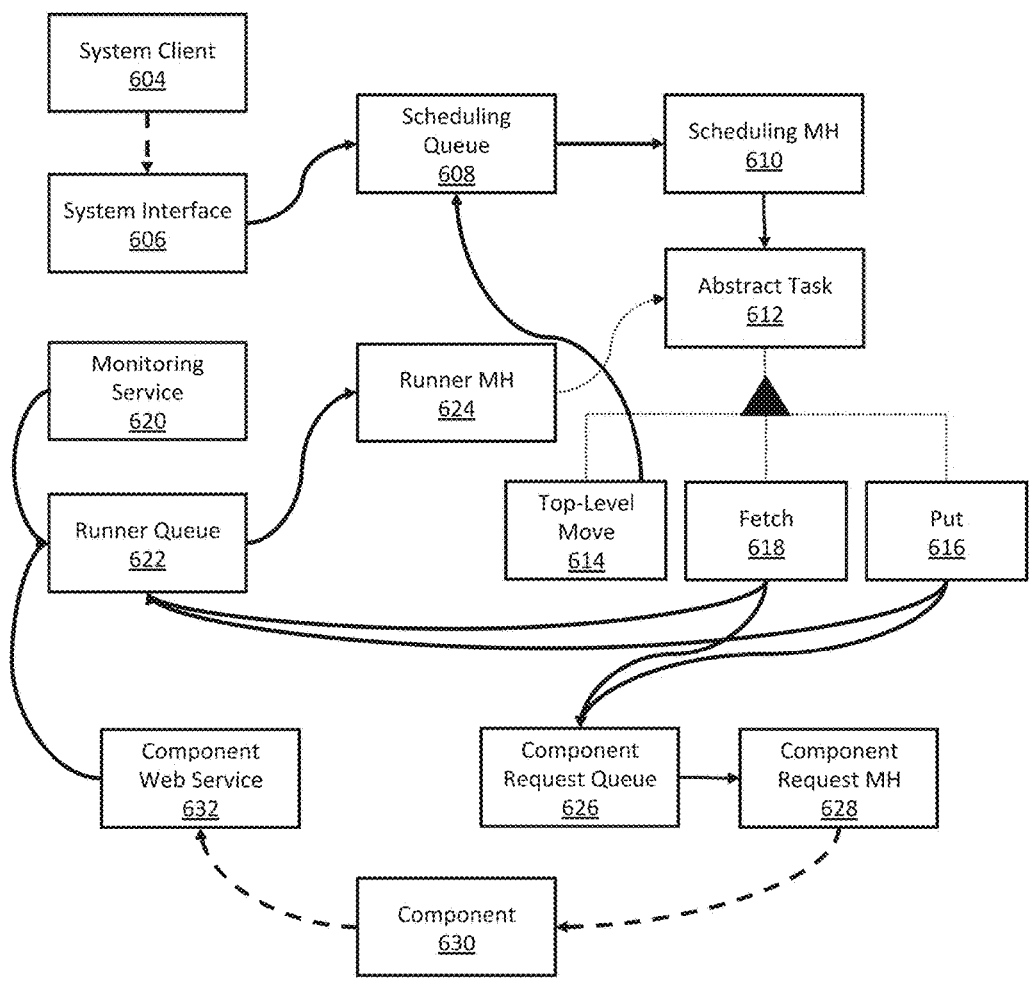

FIGS. 6A and 6B illustrates an example of asynchronous management of movable components in accordance with one embodiment. In this example, FIG. 6A illustrates a simplified processing flow 600, executed by a system manager, corresponding to an operation in a tape library system. FIG. 6B illustrates state data 602 associated with the operation. The state data is organized according to a database schema similar to the example of a database schema described above. The following discussion of FIGS. 6A and 6B is provided for exemplary purposes only and should not be construed as limiting one or more embodiments.

In FIG. 6A, different types of communication are represented using different types of lines. A heavy solid line represents a message to be handled by a message handler. A thin dashed line represents a method invocation. A heavy dashed line represents a network communication. Many different types of communication may be used and the specific types of communications illustrated in FIG. 6A should not be construed as limiting one or more embodiments. Further, in this example, the term "job" may refer to an operation, task, or subtask, and the term "device" corresponds to a physical component. For ease of reference, in this example, the term "message handler" is abbreviated as "MH."

In this example, referring first to FIG. 6A, an operation starts with a request from a system client 604 to a system interface 606, over a network connection. The request may be received via a graphical user interface (GUI), Small Computer System Interface (SCSI) connection, web service (e.g., a REST interface), or any other type of system interface 606. Specifically, in this example, the request is to move a cartridge in the tape library system. The request invokes a moveCartridge method in the system interface 606, which creates a top-level job and stores the top-level job in the state database. The moveCartridge method also transmits a message to the scheduling queue 608 to try to start the job.

When the message is processed in the scheduling queue 608, a scheduling MH 610 is initialized to handle the message. The scheduling MH 610 determines which resources are needed to complete the job. In addition, the scheduling MH 610 queries the state database to obtain a list of any other jobs that require those resources. The list is ordered by job priority and, within each priority level, by time (first in, first out). For each job in the list, the scheduling MH 610 calls the job's allocateResources method. Specifically, each type of job (such as top-level move 614, fetch 618, and put 616) inherits the allocateResources method from an abstract task 612. For a particular job, if the allocateResources method returns false, the job remains in the backlog. If the allocateResources method returns true, the job can be performed using the allocated resources. The scheduling MH 610 updates the job to a runnable state and sends a message to the runner queue 622.

When a message in the runner queue 622 is processed, a runner MH 624 is initialized. The runner MH 624 determines the type of message and the job to which the message applies. The runner MH 624 queries the state database for state data associated with the job and instantiates an object representing the job. The runner MH 624 then calls a startJob method of the job object. For a top-level move 614, the startJob method will instantiate a fetch 618. The startJob method stores the fetch job in the state database and sends a message to the scheduling queue to schedule the new job (i.e., the fetch, which is a subtask or child task of the top-level move).

The scheduling process repeats for the fetch. When the allocateResources method is called, the fetch 618 selects a robot and allocates both the robot and a rail segment needed to move the robot. When a runner message is processed for the fetch, a fetch job's startJob method will send a message for the robot to perform the fetch (i.e., the physical task of fetching the cartridge) to the component request queue 626. The fetch job also updates the state database to indicate that it is waiting for a response from the robot, and to indicate that the robot's state is "fetching."

When the message is processed in the component request queue 626, a component request MH 628 is initialized. Based on the message, the component request MH 628 transmits instructions to the component 630 (i.e., the robot), via an internal network, to perform the physical task of fetching the cartridge. In an embodiment, using a component request queue 626 and component request MH 628 means that if a rollback is needed for the job as a whole, the message to the component request queue 626 is also rolled back and no instructions are transmitted to the component 630.

The robot performs the physical task of fetching the cartridge. When the task is complete, the robot sends a response to a component web service 632. The component web service 632 creates a message based on the response and transmits the message to the runner queue 622. When the message is processed in the runner queue 622, a runner MH 624 is initialized. The runner MH 624 initialized here is different than the one initialized previously, which may have terminated by this time. Based on the message, the runner MH 624 queries the state database to obtain state data associated with the fetch job, and instantiates a fetch object. The fetch object instantiated here is different from the fetch object instantiated above. The runner MH 624 calls the deviceResponse method of the fetch object, passing in the response received from the robot. Because the task completed successfully, the fetch object updates the state database to reflect that the fetch is complete and that the robot is inactive. The fetch object transmits a message to the runner queue 624, indicating to the top-level move that the fetch is complete.

When the message is processed in the runner queue 624, a runner MH 624 is initialized. The runner MH 624 instantiates a top-level move object, using state data from the state database. The runner MH 624 calls a childComplete method of the top-level move object. The top-level move object then creates a new "put" job, stores the corresponding state data in the state database, and sends a message to the scheduling queue 608 to handle the put job. The process described above with respect to the fetch job is then repeated, mutatis mutandis, for the put job. When the put job is complete, the move operation as a whole is complete.

FIG. 6B illustrates an example of state data 602, corresponding to the example operations described above. Through the course of this example, three jobs are created in the JOB table: a TOP_LEVEL_MOVE, a FETCH, and a PUT. In the JOB_PARAMETERs table, the TOP_LEVEL_MOVE has two parameters: a SOURCE and a DESTINATION. These parameters correspond to the IDs of cells in the tape library system, recorded in the CELL table. In the RESOURCE table, these cells are allocated to the top-level move. A rail segment is not allocated for the top-level move. The FETCH has one parameter: the source cell from which to fetch the cartridge. This cell is allocated to the FETCH in the RESOURCE table, along with a robot and a rail segment. In an embodiment, a child task is allowed to allocate resources that are already allocated to its parent operation or task. However, allocation of resources in the RESOURCE table prevents the same resource from being allocated for a different operation. FIG. 6B represents a state where the FETCH has already completed, as shown in the RESOURCE_STATE column of the RESOURCE table. Alternatively, a resource record may be deleted from the RESOURCE table when a task is complete. FIG. 6B similarly shows parameters and resources corresponding to the PUT, and a state (ALLOCATED) of those resources.

In an embodiment, storing state data in a state database helps facilitate asynchronous management of movable components. Specifically, message handlers may use the state database to store and retrieve state data associated with operations, components, and/or other resources in the system. Thus, each message handler may be able to determine the current state and act on that state, even though the message handlers may be executing in different threads, on different processors, and even in different computer systems. For example, a state database may help facilitate asynchronous management of movable components using a computing cluster.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

10. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   receiving a first request to perform a first operation in a tape library, the first operation comprising a first physical task to be performed by a physical component;
   based on the first request:
      (a) initializing a first message handler executing in a first execution thread;
      (b) retrieving, from persistent storage, state data associated with the physical component;
      (c) instantiating, using the state data, a first code object representing the physical component; and
      (d) transmitting, using at least the first message handler and the first code object, instructions to the physical component to perform the first physical task;
   receiving, by a first process executing in a second execution thread different than the first execution thread, a first message from the physical component indicating completion of the physical task; and
   based on the first message from the physical component:
      (a) initializing a second message handler executing in a third execution thread; and
      (b) updating persistent storage, by the second message handler, with first updated state data associated with the physical component.

2. The medium of claim 1, wherein the operations further comprise:
   receiving a second request to perform a second operation in the tape library, the second operation comprising a second physical task to be performed by the physical component;
   based on the second request:
      (a) initializing a third message handler executing in a fourth execution thread;
      (b) retrieving, from persistent storage, the updated state data associated with the physical component;
      (c) instantiating, using the updated state data, a second code object representing the physical component; and
      (d) transmitting, using at least the third message handler and the second code object, instructions to the physical component to perform the second physical task;
   receiving, by a second process executing in a fifth execution thread different than the fourth execution thread, a second message from the physical component indicating completion of the second physical task; and
   based on the second message from the physical component:

(a) initializing a fourth message handler executing in a sixth execution thread; and
(b) updating persistent storage, by the fourth message handler, with second updated state data associated with the physical component.

3. The medium of claim 1, wherein the operations further comprise:
receiving a second request to perform a second operation in the tape library, the second operation comprising a second physical task to be performed by the physical component;
transmitting, using at least a third message handler and a second code object representing the physical component, instructions to the physical component to perform the second physical task;
receiving a second message indicating a failure of the second physical task;
based on the second message indicating the failure:
(a) initializing a fourth message handler; and
(b) performing, by the fourth message handler, at least one remedial action associated with the failure.

4. The medium of claim 3, wherein the at least one remedial action comprises undoing at least one system change associated with the second operation.

5. The medium of claim 3, wherein the at least one remedial action comprises attempting to perform the physical task using a different physical component.

6. The medium of claim 3, wherein the at least one remedial action comprises attempting to recover the first physical component.

7. The medium of claim 3, wherein the second message indicating the failure is received from a monitoring process, based on expiration of a timer associated with the second physical task.

8. The medium of claim 1, wherein state data associated with the physical component comprises a physical position of the physical component in the tape library and an idle status of the physical component.

9. The medium of claim 1, wherein the first execution thread executes on a first processor in a server cluster and the second execution thread executes on a second processor in the server cluster.

10. The medium of claim 1, wherein the operations further comprise:
terminating the first execution thread upon successfully transmitting instructions to the physical component.

11. The medium of claim 1, wherein the second execution thread and the third execution thread correspond to a same execution thread.

12. The medium of claim 1, wherein the second execution thread and the third execution thread correspond to different execution threads.

13. A system comprising:
one or more hardware processors; and
one or more non-transitory computer-readable media storing instructions, which when executed by the one or more hardware processors, cause execution of operations comprising:
receiving a first request to perform a first operation in a tape library, the first operation comprising a first physical task to be performed by a physical component;
based on the first request:
(a) initializing a first message handler executing in a first execution thread;
(b) retrieving, from persistent storage, state data associated with the physical component;
(c) instantiating, using the state data, a first code object representing the physical component; and
(d) transmitting, using at least the first message handler and the first code object, instructions to the physical component to perform the first physical task;
receiving, by a first process executing in a second execution thread different than the first execution thread, a first message from the physical component indicating completion of the physical task; and
based on the first message from the physical component:
(a) initializing a second message handler executing in a third execution thread; and
(b) updating persistent storage, by the second message handler, with first updated state data associated with the physical component.

14. The system of claim 13, wherein the operations further comprise:
receiving a second request to perform a second operation in the tape library, the second operation comprising a second physical task to be performed by the physical component;
based on the second request:
(e) initializing a third message handler executing in a fourth execution thread;
(f) retrieving, from persistent storage, the updated state data associated with the physical component;
(g) instantiating, using the updated state data, a second code object representing the physical component; and
(h) transmitting, using at least the third message handler and the second code object, instructions to the physical component to perform the second physical task;
receiving, by a second process executing in a fifth execution thread different than the fourth execution thread, a second message from the physical component indicating completion of the second physical task; and
based on the second message from the physical component:
(c) initializing a fourth message handler executing in a sixth execution thread; and
(d) updating persistent storage, by the fourth message handler, with second updated state data associated with the physical component.

15. The system of claim 13, wherein the operations further comprise:
receiving a second request to perform a second operation in the tape library, the second operation comprising a second physical task to be performed by the physical component;
transmitting, using at least a third message handler and a second code object representing the physical component, instructions to the physical component to perform the second physical task;
receiving a second message indicating a failure of the second physical task;
based on the second message indicating the failure:
(c) initializing a fourth message handler; and
(d) performing, by the fourth message handler, at least one remedial action associated with the failure.

16. The system of claim 15, wherein the at least one remedial action comprises undoing at least one system change associated with the second operation.

17. The system of claim 15, wherein the at least one remedial action comprises attempting to recover the first physical component.

18. The system of claim 13, wherein state data associated with the physical component comprises a physical position of the physical component in the tape library and an idle status of the physical component.

19. The system of claim 13, wherein the operations further comprise:

terminating the first execution thread upon successfully transmitting instructions to the physical component.

20. A method comprising:

receiving a first request to perform a first operation in a tape library, the first operation comprising a first physical task to be performed by a physical component;

based on the first request:
  (a) initializing a first message handler executing in a first execution thread;
  (b) retrieving, from persistent storage, state data associated with the physical component;
  (c) instantiating, using the state data, a first code object representing the physical component; and
  (d) transmitting, using at least the first message handler and the first code object, instructions to the physical component to perform the first physical task;

receiving, by a first process executing in a second execution thread different than the first execution thread, a first message from the physical component indicating completion of the physical task; and based on the first message from the physical component:
  (a) initializing a second message handler executing in a third execution thread; and
  (b) updating persistent storage, by the second message handler, with first updated state data associated with the physical component;

wherein the method is performed by at least one device comprising a hardware processor.

* * * * *